United States Patent [19]

Narumiya

[11] 4,426,287

[45] Jan. 17, 1984

[54] MOLTEN METAL FILTERING DEVICE

[75] Inventor: Tsuneaki Narumiya, Yokohama, Japan

[73] Assignee: Bridgestone Tire Co., Ltd., Tokyo, Japan

[21] Appl. No.: 332,094

[22] Filed: Dec. 17, 1981

[30] Foreign Application Priority Data

Dec. 27, 1980 [JP] Japan ............................ 55-190374[U]

[51] Int. Cl.³ .......................................... B01D 23/02
[52] U.S. Cl. .................................... 210/184; 210/446; 210/451; 210/510.1
[58] Field of Search ............... 210/773, 184, 186, 446, 210/447, 448, 451, 452, 510

[56] References Cited

U.S. PATENT DOCUMENTS

| 3,281,238 | 10/1966 | Bachowski et al. | 210/773 X |
| 3,337,054 | 8/1967 | Sauer | 210/186 X |
| 3,524,548 | 8/1970 | McDonald et al. | 210/510 X |
| 3,747,765 | 7/1973 | Nowak | 210/510 X |
| 3,893,917 | 7/1975 | Pryor et al. | 210/510 X |
| 3,947,363 | 3/1976 | Pryor et al. | 210/510 |
| 4,052,198 | 10/1977 | Yarwood et al. | 210/773 X |
| 4,081,371 | 3/1978 | Yarwood et al. | 210/510 X |
| 4,113,241 | 9/1978 | Dore | 210/510 X |
| 4,158,632 | 6/1979 | Dantzig et al. | 210/510 |

Primary Examiner—Robert H. Spitzer
Attorney, Agent, or Firm—Birch, Stewart, Kolasch & Birch

[57] ABSTRACT

Safe and perfect filtration of molten metal such as molten aluminium is obtained efficienty by a molten metal filtering device which comprises a filter housing provided in a flow path for molten metal, a horizontal partition disposed within the filter housing and having at least one filter-setting hole bored therethrough. A filter frame is detachably fitted to said filter-setting hole in such a manner that the upper part thereof protrudes from the filter-setting hole, and a filter medium is set in position within the filter frame at a level such that the upper surface of the filter medium falls below an inflow path and an overflow path for the molten metal.

6 Claims, 2 Drawing Figures

MOLTEN METAL FILTERING DEVICE

BACKGROUND OF THE INVENTION

This invention relates to a filtering device for a molten metal such as molten aluminum, and more particularly to a molten metal filtering device so constructed that the filter medium of porous ceramic material in the shape of a flat plate can be changed without difficulty and it can be prevented from being clogged either owing to the incoming of the oxide film on the surface of the molten metal or owing to the solidification of the molten metal due to the drop of temperature of the filter medium itself.

In recent years, there have been proposed molten metal filter media which are made of porous ceramic material and formed in the shape of flat plates. The filter media of this kind have large capacities for filtration and are able to provide effective treatment of successive lots of molten metal produced in the smelting furnace. However, considerable problems have occurred in the conventional molten metal filtering devices fitted with the filter medium of porous ceramic material in the shape of a flat plate.

In the conventional filtering devices, molten metal flows downwardly to the filter medium. When the inflow of the molten metal from smelting furnaces to the filtering device is stopped during switching from one smelting furnace to another or after the end of the filtering operation, the molten metal left in the filtering device flows away from the device through the filter medium. For this, the filter medium is exposed in the ambient air. In this time, the filter medium may become clogged because the oxide film, such as aluminum oxide film, which is formed on the surface of the molten metal contacted with the ambient air in the filtering device, flows into the filter medium with the remaining molten metal and sticks on the medium. The filter medium may also be clogged because the molten metal which sticks on the medium or is left in the medium is solidified due to the drop of temperature of the filter medium exposed in the air.

The conventional molten metal filtering devices, especially those used for filtering molten metal produced by a plurality of successively operated smelting furnaces, operated do not give sufficient consideration to the problem of solidification of molten metal in the filter media which occurs while the devices are maintained during switching from one smelting furnace to another, as well as to the problem of damage done to the filter media due to such solidification.

Moreover, in the conventional filtering device, the used filter medium must be changed to a new one when it is exposed in the air and cooled to a lower temperature. When the conventional filtering devices are actually put to use, the filter media incorporated therein cannot be easily changed at the elevated temperatures at which the devices are operated.

The batchwise operation which comprises the steps of fusing a metal, especially aluminum in the form of ingots, in a smelting furnace, filtering the produced molten metal with a filter medium, and casing the filtered molten metal and producing slabs or billets has found popular acceptance. Recently, with a view to enhancing the productivity of this operation and ensuring the economization of energy, efforts are being made to shorten the intervals between the successive batchwise operations of the smelting furnace. When the intervals between the batchwise operations of the smelting furnace are to be shortened, no time can be spared for allowing the temperature of the filter medium and that of the filtering device using the filter medium to fall sufficiently. Consequently, the work for changing the filter medium must be carried out while the filter medium is kept at its elevated temperature. This work, therefore, proves to be dangerous. Furthermore, in the conventional filtering device in which a filter medium made of porous ceramic material and not readily wetted with the molten metal is arranged, occurs a lag occurs between the time the molten metal reaches the upper side of the filter medium exposed in the air and the time the molten metal begins to pass the filter medium. Therefore a head greater than the head of the molten metal during the filtration is required.

Thus, the development of a device which permits easy and safe changing of the filter medium has long been in demand. Moreover, in order to fully utilize the advantageous properties of the filter medium made of porous ceramic material, i.e. large capacity for filtration and effective treatment of successive lots of molten metal, there is a need for the development of a device capable of lessening the frequency of changing such filter media.

SUMMARY OF THE INVENTION

An object of this invention is to provide a filtering device for a molten metal such as molten aluminum which enables the filter medium to be attached thereto and detached therefrom without difficulty and provides ample protection for the filter medium.

According to the present invention, there is provided a molten metal filtering device which solves the problems mentioned above comprising a filter housing provided in a flow path for molten metal, a horizontal partition disposed within the filter housing and having at least one filter-setting hole bored therethrough, a filter frame detachably fitted to the filter-setting hole in such a manner that the upper part thereof protrudes from the filter-setting hole, and a filter medium set within the filter frame at a level such that the upper surface of the filter medium falls below the inflow path and the overflow path for the molten metal.

To be specific, in the filtering device of this invention, the filter housing formed in the flow path for molten metal is provided therein with the horizontal partition, the horizontal partition has at least one filter-setting hole bored therethrough, and the filter frame in which the filter medium is set in position is fitted in the filter-setting hole in such a manner that the upper part of the filter frame protrudes from the upper surface of the horizontal partition. The upper part of the filter frame which protrudes from the horizontal partition, therefore, affords a convenient means for holding by workers for removing and replacing the filter frame for the purpose of changing the filter medium. Thus, the filter medium used in the filtering device of this invention can be changed easily without any possibility of sustaining damage. During the change of filter media in the conventional filtering devices, there inevitably occurs the disadvantage that such filter media are broken and the fragments of the broken filter media are caused to mingle into the molten metal under treatment. The filtering device of this invention has no possibility of entailing this disadvantage.

Moreover, since the inflow path and overflow path for the molten metal are formed in a level higher than the upper surface of the filter medium as held in its operating position, the filter medium is kept immersed in the molten metal at all times whether or not the filtering device is in operation. Even when the filter medium is made of a porous ceramic material possessing a poor ability to wet the molten metal, therefore, once the flow of molten metal is started after an interruption, the filter medium immediately begins to filter the molten metal without ever experiencing the otherwise possible inconvenience of being maintained in its unwet state until the start of the subsequent flow of molten metal. Even where a plurality of smelting furnaces are operated and frequently switched from one to another, therefore, the filtering of the molten metal can be resumed with no loss of time by the filtering device of the present invention.

Since the filter medium is constantly immersed in the molten metal as described above, it is isolated from the ambient air. While the filter medium is kept waiting during the switch of one smelting furnace to another, therefore, the filter medium does not experience the trouble of being clogged owing to the incoming of the oxide film such as aluminum oxide film formed on the surface of the molten metal or owing to the solidification of the molten metal due to the drop of temperature thereof. By switching the flow paths for molten metal from a plurality of smelting furnaces, therefore, the filtration of the molten metal can be efficiently carried out with just one filtering device of this invention. Since the filtering device requires no time to be spared for keeping the filter medium waiting during the switch of one smelting furnace to another, the operation enjoys improved productivity. Further, since the operation of the filtering device involves no wasteful release of thermal energy, it contributes greatly to the economization of energy.

The filtering device of this invention may preferably be used for filtering molten aluminum.

The other objects and characteristics of the present invention will become apparent from the further disclosure of the invention to be made herein below with reference to the accompanying drawings.

DESCRIPTION OF THE PREFERRED EMBODIMENT

Figure 1:
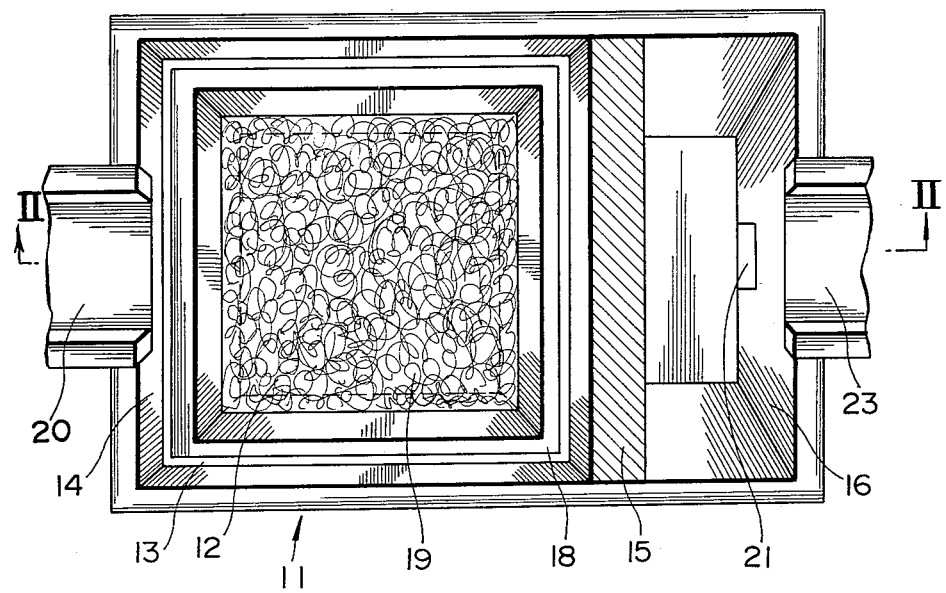
FIG. 1 is a sectioned top view illustrating one embodiment of the present invention.
Figure 2:
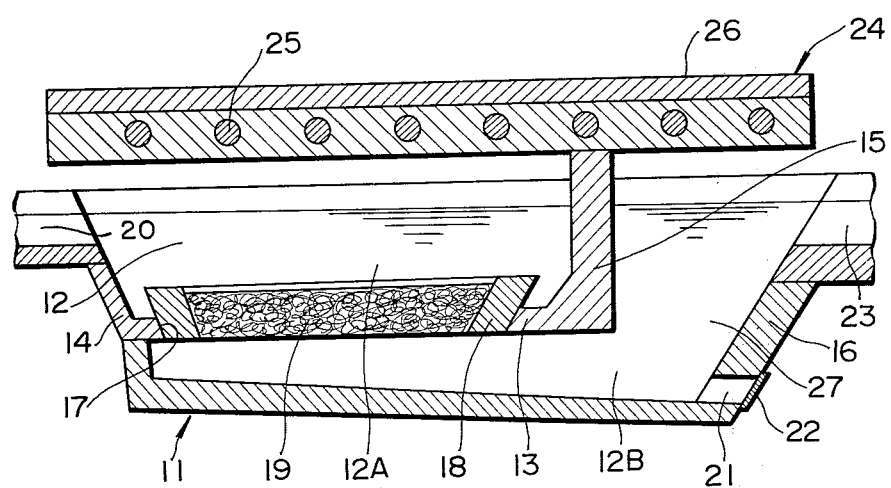
FIG. 2 is a sectioned side view taken along the line II—II in the diagram of FIG. 1.

Now, this invention will be described below specifically with reference to one working example.

In the drawings, 11 denotes a molten metal filtering device proper made of refractory material and provided in a flow path for molten metal, with the inner surfaces thereof defining the lateral sides of an inversed, truncated quadrangular pyramid. Within this filtering device proper 11 is formed a filter housing 12. Inside this filter housing 12, a horizontal partition 13 is extended in a horizontal direction from one lateral wall 14 of the filtering device proper 11. In one edge portion of the horizontal partition 13, a vertical partition wall 15 is integrally raised upwardly as separated substantially by a prescribed distance from the opposite lateral wall 16 of the filtering device proper 11. The horizontal partition 13 and the vertical partition wall 15 divide the filter housing 12 into two halves.

The aforementioned horizontal partition 13 has a stated number (one in the illustrated embodiment) of generally quadrangular filter-setting hole 17 whose inner walls are converged downwardly. In this filter-setting hole 17, a filter frame 18 which is formed of a refractory material such as refractory bricks or carborundum in a pattern enclosing an empty space of the shape of an inverted, truncated quadrangular pyramid is detachably yet liquid-tightly fitted so that the upper part of the frame 18 will protrude from the horizontal partition 13. In the opening of this filter frame 18, a filter medium 19 made of porous ceramic material in the shape of a flat plate whose lateral walls define the sides of an inverted, truncated quadrangular pyramid liquid-tightly set in position. A preferred example of the filter medium 19 of porous ceramic material is a ceramic foam which is prepared by coating a flexible polyurethane foam having a substantially skeletal reticulated structure with a ceramic slurry and subsequently drying and sintering the coated foam, thereby removing the polyurethane foam through carbonization to leave ceramic strands.

In the aforementioned filter housing 12, an inflow path 20 of the shape of a groove for the delivery of molten metal is formed at a position higher than the upper surface of the aforementioned filter medium 19 in one enclosure 12A of the two enclosures produced by the interposition of the horizontal partition 13 and the vertical partition wall 15.

The bottom wall of the other enclosure 12B of the filter housing 12 divided by the horizontal partition 13 and the vertical partition wall 15 is slanted downwardly from the lateral wall to the other lateral wall. At the substantially lowest position of the bottom wall, there is formed a molten metal outlet 21 which is normally kept closed with a lid 22 and opened when necessary. Above the aforementioned enclosure 12B, a molten metal overflow path 23 is formed in the shape of a groove at a level higher than the filter medium 19.

Directly above the vertical partition wall 15, a heater 24 having a multiplicity of heat generating members 25 arrayed in a horizontal row and provided on the upper side thereof with an insulating member 26 is disposed to cover the filter housing 12. This heater 24 serves to supply more heat than is radiated from the molten metal in the filter housing 12 in order to prevent the molten metal from solidifying especially when the filtering device is kept waiting during the switch from one smelting furnace to another.

Now, the filtration of molten metal by use of the molten metal filtering device illustrated above will be described. The molten metal, such as molten aluminium from a smelting furnace (not shown) which, has flowed through the molten metal inflow path 20 into the filter housing 12 flows into the enclosure 12A, passes downwardly through the filter medium 19 owing to the gravitational attraction, and enters the other enclosure 12B. In this case, solid impurities entrained by the molten metal are retained on the filter medium 19. The molten metal which has been freed from the solid impurities and passed into the other enclosure 12B ascends the flow path 27 formed between the other lateral wall 16 and the vertical partition wall 15 and overflows into the overflow path 23.

In the molten metal filtering device of the illustrated embodiment, the molten metal brought in from the smelting furnace is filtered by the filter medium 19. Since the upper surface of the filter medium 19 falls in a level lower than the inflow path 20 and the overflow path 23, the filter medium 19 is always kept immersed in the molten metal. Generally, as described above, in the case of the conventional filtering device in which a filter medium made of porous ceramic material not readily wetted with the molten metal is arranged, a lag occurs between the time the molten metal reaches the upper side of the filter medium and the time the molten metal begins to pass the filter medium and a head greater than the head of the molten metal during the filtration is required. The filter medium in the filtering device of this invention does not experience such inconveniences because of being always kept immersed in the molten metal. Further, since the filter medium is kept immersed in the molten metal, it is not exposed to the ambient air. When the filtering device is kept waiting during the switch from one smelting furnace to another, therefore, the filter medium is not clogged either owing to the incoming of the oxide film on the surface of the molten metal or owing to the solidification of the molten metal due to the drop of temperature. Thus, the filter medium formed of porous ceramic material has a large capacity for filtration, an ability to quickly treat a large volume of molten metal, and, as described above, does not become clogged. Therefore, in a system wherein the molten metal flow paths from a multiplicity of smelting furnaces are operated by regularly switching from one to another, continuous filtration of the molten metal can be accomplished by the use of just one filtering device of the present invention. Even in the operation of this sort, the filter medium formed of porous ceramic material continues to fulfil its function efficiently without requiring replacement for a long period of time.

The filter frame 18 in which the filter medium 19 is set in position is fitted to the filter-setting hole 17 in such a manner that the upper portion of the filter frame 18 protrudes from the upper surface of the horizontal partition 13. The upper portion of the filter frame 18 thus protruding above the horizontal partition 13, affords a convenient holding means which permits ready removal and replacement of the filter frame 18 for the purpose of changing the filter medium 19. Accordingly, the change of the old filter medium to a new one is easily carried out by exchanging the filter frame. Thus, the filtering device of this invention can be expected to provide safe and easy exchange of the filter medium and perfect filtration of molten metal as compared with the conventional filtering devices which inevitably involves a dangerous, time-consuming work of thoroughly removing the hot molten metal from the filter housing, subsequently breaking the exhausted filter medium and removing the fragments of the broken filter medium. This process with a conventional device entails the possibility that such fragments of the broken filter medium will remain unremoved in the filter housing and mingle into the molten metal to be treated in the subsequent cycle of filtration.

Further, since the heat generating members 25 are capable of generating more heat than is radiated by the molten metal in the filter housing 12 and are arrayed above the filter housing 12, the temperature of the molten metal in the filter housing 12 does not drop while the filtering device maintained during the switch of one molten metal flow path from one smelting furnace to another molten metal flow path of another smelting furnace. Thus, the filtration of molten metal can be continued stably at all times.

In the embodiment described above, only one filter medium is attached to the horizontal partition 13. The number of filter mediums is not limited to one but may be two or more as occasion demands. Besides, the number of horizontal partitions 13 in which the filter medium 19 is set in position is not limited to one. Optionally, a multiplicity of such horizontal partitions each incorporating a filter medium may be disposed in as many step, so that the filtration of molten metal may be effected through the plurality of steps. The shape and other factors of the filter medium may be suitably selected.

It is further understood by those skilled in the art that the foregoing description is a preferred embodiment and that various changes and modifications may be made in the invention without departing from the spirit and scope thereof.

What is claimed is:

1. A molten metal filtering device for a molten metal comprising:
   a filter housing provided in a flow path for molten metal;
   a horizontal partition disposed within said filter housing and having at least one filter frame-setting hole therethrough;
   a filter frame detachably fitted to said filter frame-setting hole, including a filter medium-receiving hole therethrough and including an upper portion which protrudes from said filter frame-setting hole to provide a holding means for being grasped to permit easy removal and replacement of said filter frame; and
   a filter medium in the shape of a substantially flat plate positioned within said filter medium-receiving hole of said filter frame at a level such that the upper surface of said filter medium is below said holding means defined by the protruding upper portion of said filter frame and is below an inflow path and an overflow path of said molten metal for maintaining said filter medium and filter frame immersed in molten metal when said filtering device is not in operation, and wherein said filter medium immersed in molten metal is exchanged by grasping said holding means and removing and replacing said filter frame and filter medium without removing molten metal from said filter housing.

2. The filtering device according to claim 1, wherein the filter medium is formed of a porous ceramic material.

3. The filtering device according to claim 2, wherein the porous ceramic material is a ceramic foam obtained by coating a flexible polyurethane foam having a substantially skeletal reticulated structure with a ceramic slurry and sintering the foam coated with the ceramic slurry to remove the foam and leave the ceramic strands.

4. A molten metal filtering device as in claim 1, wherein said filter housing further includes a cover means having a plurality of heat generating means integral therewith.

5. A molten metal filtering device for a molten metal comprising:
   a filter housing provided in a flow path for molten metal;

a horizontal partition disposed within said filter housing and having at least one filter frame-setting hole therethrough;

a filter frame detachably fitted in said filter frame-setting hole, including a filter medium-receiving hole therethrough and including an upper part thereof which protrudes from said filter frame-setting hole to provide a holding means for being grasped to permit ready removal and replacement of said filter frame;

a filter medium in the shape of a substantially flat plate formed of a porous ceramic material positioned within said filter medium-receiving hole of said filter frame at a level such that the upper surface of said filter medium is below said holding means defined by the protruding upper part of said filter frame and is below an inflow path and an overflow path for said molten metal for maintaining said filter medium and filter frame immersed in molten metal when said filtering device is not in operation, wherein said filter medium immersed in molten metal is exchanged by grasping said holding means and removing and replacing said filter frame and filter medium without removing molten metal from said filter housing; and heat generating means provided above said filter housing and supplying more heat than is radiated from the molten metal in said filter housing whereby the temperature of the molten metal in the filter housing does not drop while the filtering device is switched from the molten metal flow path of one smelting furnace to another metal flow path of another smelting furnace.

6. The filtering device according to claim 5, wherein the porous ceramic material is a ceramic foam obtained by coating a flexible polyurethane foam having a substantially skeletal reticulated structure with a ceramic slurry and sintering the foam coated with the ceramic slurry to remove the foam and leave the ceramic strands.

* * * * *